United States Patent
Bechevet et al.

[11] Patent Number: 5,981,093
[45] Date of Patent: Nov. 9, 1999

[54] MAGNETO-OPTICAL RECORDING MEDIUM AND PRODUCTION PROCESS

[75] Inventors: Bernard Bechevet, Claix; Jacques Daval, Meylan; Bruno Valon, Grenoble; Marie-Françoise Armand, Vaulnaveys-le Haut, all of France

[73] Assignee: Commissariat a l'Energie Atomique, Paris, France

[21] Appl. No.: 08/813,999

[22] Filed: Mar. 10, 1997

[30] Foreign Application Priority Data

Mar. 15, 1996 [FR] France .................................. 96 03304

[51] Int. Cl.⁶ ........................................................ G11B 5/66
[52] U.S. Cl. ......................... 428/694 ML; 428/694 SC; 428/694 DE; 428/694 MT; 428/694 RE; 428/694 MM; 428/900; 427/128; 427/129; 427/130; 427/131
[58] Field of Search .................... 428/694 ML, 694 SC, 428/694 DE, 694 MT, 694 RE, 694 MM, 900; 427/128–131

[56] References Cited

FOREIGN PATENT DOCUMENTS

| | | |
|---|---|---|
| 0 258 978 | 3/1988 | European Pat. Off. . |
| 0 314 424 | 5/1989 | European Pat. Off. . |
| 0 428 946 | 5/1991 | European Pat. Off. . |
| 0 432 038 | 6/1991 | European Pat. Off. . |
| 0 475 446 | 3/1992 | European Pat. Off. . |
| 35 37 191 | 4/1986 | Germany . |
| 63-276728 | 11/1988 | Japan . |
| 2-023553 | 1/1990 | Japan . |

OTHER PUBLICATIONS

Patent Abstracts of Japan, vol. 12, No. 240 (P–727), Jul. 8, 1988, JP–A–63–032748, Feb. 12, 1988.
Patent Abstracts of Japan, vol. 14, No. 167 (P–1031), Mar. 30, 1990, JP–A–02–023553, Jan. 25, 1990.
Patent Abstracts of Japan, vol. 16, No. 421 (P–1414), Sep. 4, 1992, JP–A–04–141845, May 15, 1992.
Patent Abstracts of Japan, vol. 13, No. 96, (P–839), Mar. 7, 1989, JP–A–63–276728, Nov. 15, 1988.
Patent Abstracts of Japan, vol. 15, No. 87, (P–1173), Feb. 28, 1991, JP–A–02–302948, Dec. 14, 1990.
Patent Abstracts of Japan, vol. 18, No. 264 (P–1740), May 19, 1994, JP–A–06–036371, Feb. 10, 1994.
Patent Abstracts of Japan, vol. 18, No. 346 (P–1762), Jun. 29, 1994, JP–A–6–084213, Mar. 25, 1994.

*Primary Examiner*—Leszek Kiliman
*Attorney, Agent, or Firm*—Oblon, Spivak, McClelland, Maier & Neustadt, P.C.

[57] ABSTRACT

A magneto-optical recording medium having a stack of magnetic layers which include at least one rare earth element and at least one transition metal element. At least one of the magnetic layers contain fluorine with an atomic concentration less than 1%. A process for producing a magneto-optical recording medium including magnetic layers. The process includes a step of controlling the Curie temperatures of the magnetic layers by controlling a fluorine atomic concentration of the magnetic layers.

21 Claims, 8 Drawing Sheets

MAGNETO-OPTICAL RECORDING MEDIUM AND PRODUCTION PROCESS

DESCRIPTION

1. Technical Field

The present invention relates to a magneto-optical recording medium and to a process for the production thereof.

The invention is applied to magneto-optical recording, no matter whether it is on disk, on tape or on any other substrate.

2. Prior Art

Magneto-optical recording consists of creating, in an appropriate magnetic layer, magnetic domains oriented perpendicularly to the plane of the layer (writing operation) and then measuring the rotation of the polarization plane undergone by a light beam on traversing said layer (reading operation).

In the earlier versions of such recording devices, in order to re-write an information in an already written zone, it was necessary to start by erasing said zone. To avoid this intermediate stage, which lengthened the access time, it was suggested that use be made of stacks of various magnetic layers, whose magnetic properties (particularly the Curie temperature and coercive field) are such that a so-called "direct overwriting" (DOW) is possible.

FIG. 1 shows an example of a known stack of this type. This stack comprises a reading layer CL, a writing layer CE, a switching layer CB and an initialisation layer CI. The stack rests on a substrate 10, e.g. of glass. A laser beam 12 reads and/or writes informations in the layer CL.

The materials used in such stacks are compounds of rare earth (TR) and transition metal (MT), with optionally a supplementary metal.

The rare earth and transition metal are chosen in such a way that the Curie temperatures of the compounds are arranged in stages in the manner indicated in FIG. 2, where To is the ambient temperature, (Tc)B the Curie temperature of the switching layer CB, (Tc)L the Curie temperature of the reading layer CL, (Tc)E the Curie temperature of the writing layer CE and finally (Tc)I the Curie temperature of the initialisation layer CI.

The coercive field Hc of the layers varies as a function of the temperature, as indicated in FIG. 3. The ordinate Hi represents the initialisation field of the reader.

It is possible to show that by raising the layers successively to appropriate temperatures, firstly between (Tc)B and (Tc)L and then, if appropriate, between (Tc)L and (Tc)E, it is possible to re-write in the layer CL any information bit (0 or 1), no matter what the bit already located there. The necessary temperature variations are obtained by modulating the intensity of the light beam. This process takes place in the presence of a magnetic polarization field supplied by the reader.

A description of these structures and this process can e.g. be obtained from the article entitled "Exchange-Coupled Multilayer Films for Direct Overwrite in Magneto-Optical Disk" by K. TSUTSUMI published in IEEE Translation Journal on Magnetics in Japan, vol. 7 No. 8, August 1992, pp 645–653.

Other stacks are also known, which use six layers instead of four. The supplementary layers lead to freedom from the external polarization magnetic field.

Various layers of dielectric, resin, reflecting material, etc. can be added to the basic magnetic stack.

The magneto-optical procedure is nowadays used in the production of minidisks MD for audio use and 3½" and 5¼" disks with a capacity from 120 megabytes to 1 gigabyte for data processing applications. These disks comply with a very precise specification (Rainbow book for MD and ISO/IEC standards for data processing disks). Inter alia there is a definition of a carrier to noise ratio or CNR as a function of the temperature or the writing field applied. From said parameter is deduced a sensitivity of the material to the initiation of writing. Thus, the attached FIG. 4 shows the course of this carrier to noise ratio (CNR) as a function of the field applied H. The gradient of the transition reflects the sensitivity of the support or medium.

Certain characteristics of magnetic layers can be adjusted by adding nitrogen or oxygen in an appropriate proportion to certain layers. For example, EP-A-314 424 teaches that it is possible to add oxygen. Japanese Patent Abstracts vol. 018, No. 264 (P. 1740) and vol. 18, No. 346 (P. 1762) teach that it is possible to add to the argon used in the cathodic sputtering operation, oxygen or nitrogen.

However, oxygen and nitrogen lead to disadvantages. In the case of oxygen, the magnetic properties of the layers are relatively insensitive thereto, so that the concentrations used must be relatively high, which gives rise to ageing problems.

However, in the case of nitrogen, the sensitivity of the layers is very high, so that it is difficult to control the properties of the layers. Moreover, as nitrogen is present in the atmosphere, it can enter the targets and enclosures in an uncontrollable manner.

The object of the present invention is to obviate these disadvantages by proposing the use of a gas other than nitrogen and oxygen in order to act on the properties of the stack layers.

DESCRIPTION OF THE INVENTION

To this end, the invention proposes using fluorine.

Thus, the present invention specifically relates to a magneto-optical recording medium comprising a stack of magnetic layers of compound (TR-MT) of at least one rare earth (TR) and at least one transition metal (MT), said medium being characterized in that at least one of the layers of the stack contains fluorine in a proportion below approximately a few per cent.

The fluorine concentration can e.g. be approximately 0.5%, or approximately 0.25%, or approximately 0.1%.

According to the simplest embodiment, the magnetic layers are also based on the same (TR-MT) compound of at least one rare earth and at least one transition metal, the composition of the different layers only differing through the fluorine proportion which they contain.

According to another embodiment, use is made of two different base compounds. A first category of layers is based on a first (TR-MT)1 compound of rare earth and transition metal, certain layers also incorporating fluorine and a second category of layers is based on a second (TR-MT)2 compound of rare earth and transition metal, certain layers also incorporating fluorine.

Any stack type can be used according to the invention, particularly stacks with 2, 4 or 6 layers.

Any known or future material can be used. Preferably, the rare earth (TR) is taken from within the group Tb, Gd, Dy, Nd and Pr. A compound can comprise one or more rare earths, e.g. Tb and Dy.

The transition metal (MT) is also of a random nature and can e.g. be Fe or Co. The compound can also incorporate a metal such as Cr, Ti or Mo.

The present invention also relates to a process for the production of a recording medium as defined hereinbefore. In this process and in known manner, on a substrate are deposited magnetic layers by the cathodic sputtering of at least one (TR-MT) compound based on rare earth (TR) and transition metal (MT) in the presence of an inert gas. The process of the invention is characterized in that, for depositing certain of the layers of the stack, to the inert gas is added fluorine in a proportion below a few per cent.

The fluorine can be introduced into the sputtering enclosure in e.g. the form $CF_4$, or $SF_6$, or even as pure fluorine. The fluorine proportion can be below 1%, e.g. approximately 0.5, or 0.25, or 0.1%.

According to the invention, the introduction of fluorine is not intended to produce a chemical reaction of an already deposited material, but instead a certain quantity of fluorine is added to a compound at the very instant when it is deposited. According to the invention, the surface of a layer is not chemically treated and instead the fluorine is homogeneously distributed within the entire volume of the layer.

DETAILED DESCRIPTION OF EMBODIMENTS

Figure 1:
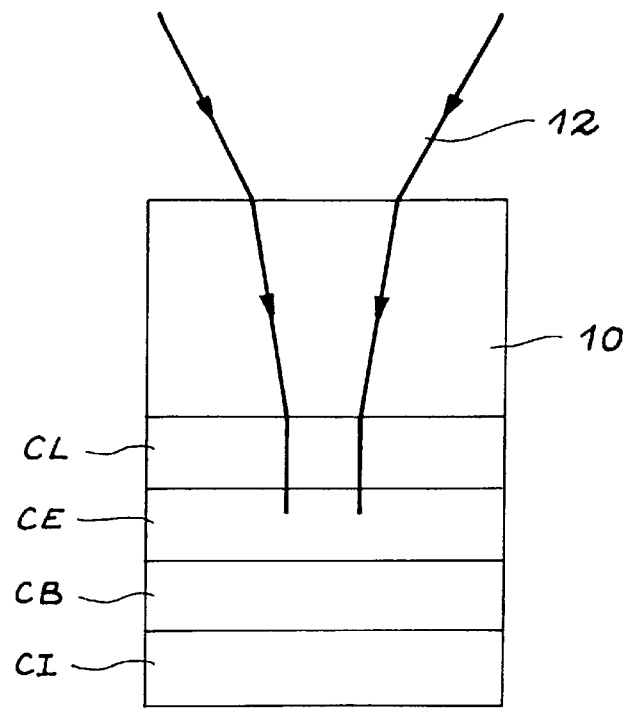
FIG. 1, already described, shows a known stack.
Figure 2:
FIG. 2, already described, shows the Curie temperature distribution of the different layers of the stack.
Figure 3:
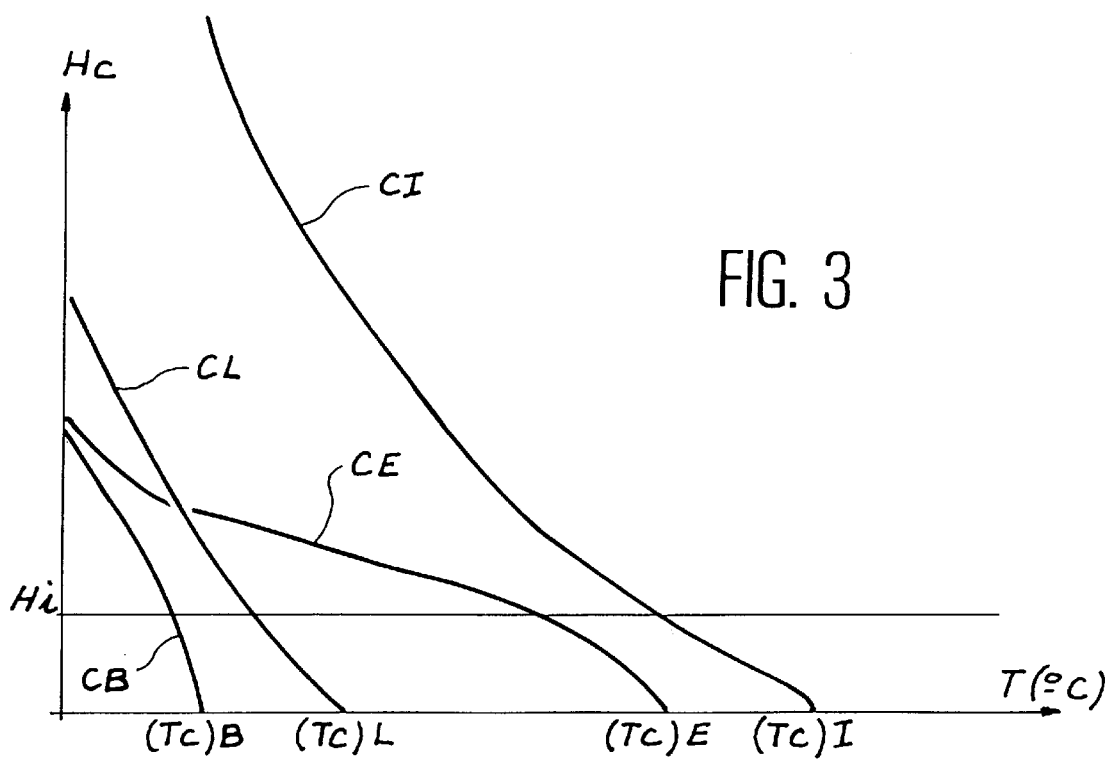
FIG. 3, already described, shows the coercive field variations of the layers as a function of the temperature.
Figure 4:
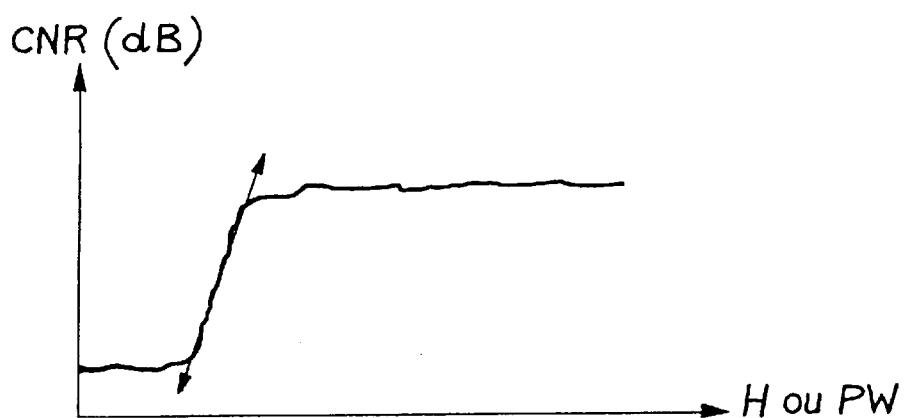
FIG. 4, already described, shows the curve of the carrier to noise ratio as a function of the field.
Figure 5:
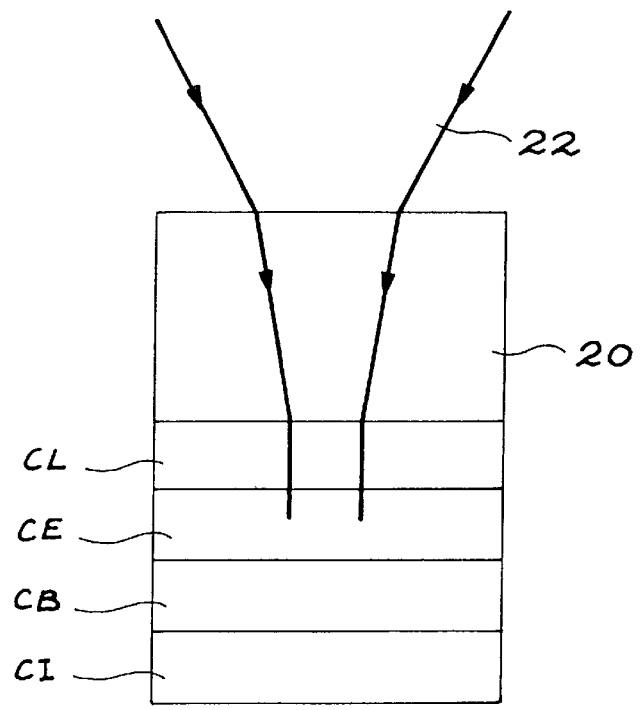
FIG. 5 illustrates an embodiment of a recording medium according to the invention.

FIG. 5 shows an embodiment of a recording medium according to the invention. In this embodiment, the stack comprises four layers deposited on a substrate 20, namely a reading layer CL, a writing layer CE, a switching layer CB and an initialisation layer CI. Possible layers of dielectric, resin, etc. are not shown. The support or medium is read and written by a laser beam 22.

Such a medium can be obtained by placing in an cathodic sputtering installation a single (TR-MT) compound target. Fluorine is supplied at a regulatable rate to the standard argon inlet. In exemplified manner, the applicant has used a $Tb_{24}Fe_{68}Co_8$ target. The $CF_4$ percentages in the argon were as follows, as a function of the deposited layers:

initialisation layer (CI) deposit: 0%
switching layer (CB) deposit: 0.5%
writing layer (CE) deposit: 0.25%
reading layer (CL) deposit: 0.375%

Figure 6:
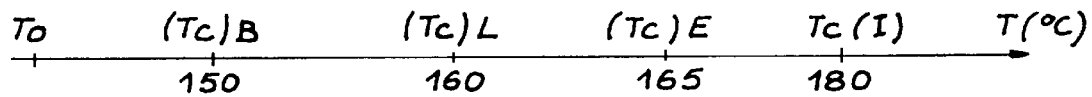
FIG. 6 shows the Curie temperature distribution in the previous embodiment.

The Curie temperatures obtained for the layers are shown along the axis of FIG. 6. These temperatures are respectively 150, 160, 165 and 180° C. It can be seen that they are in the order required for direct overwriting, namely:

$$(Tc)B<(Tc)L<(Tc)E<(Tc)I$$

The composition of the layers can be determined by conventional physicochemical analyses, e.g. by nuclear reaction analysis (NRA) or secondary ion mass spectroscopy (SIMS).

Figure 7:
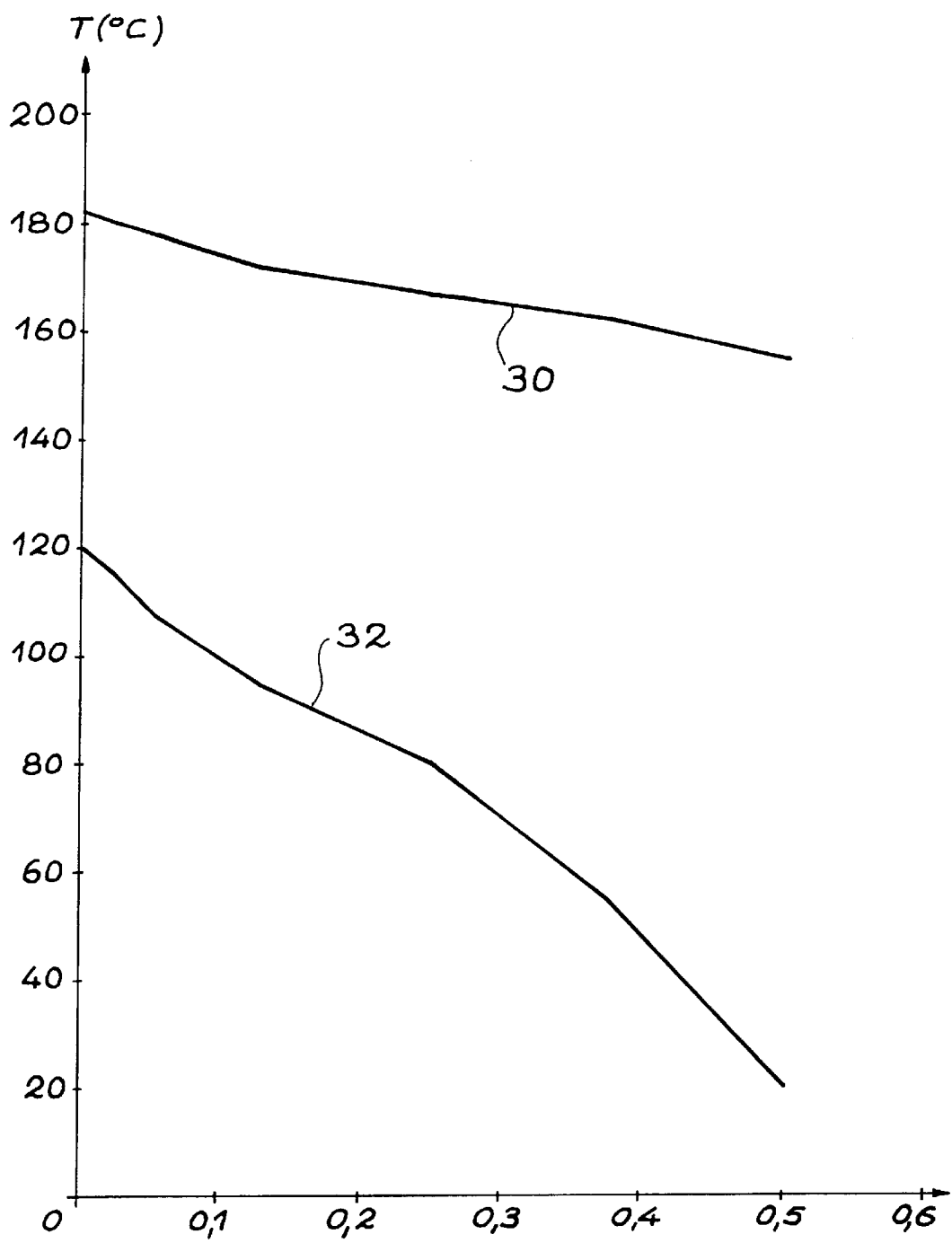
FIG. 7 shows the Curie temperature and compensation temperature variations.

FIG. 7 shows Curie temperature variations (curve 30) and compensation temperature variations (curve 32) as a function of the $CF_4$ percentage introduced into the enclosure for the compound $Tb_{24}Fe_{68}Co_8$.

Figure 8:
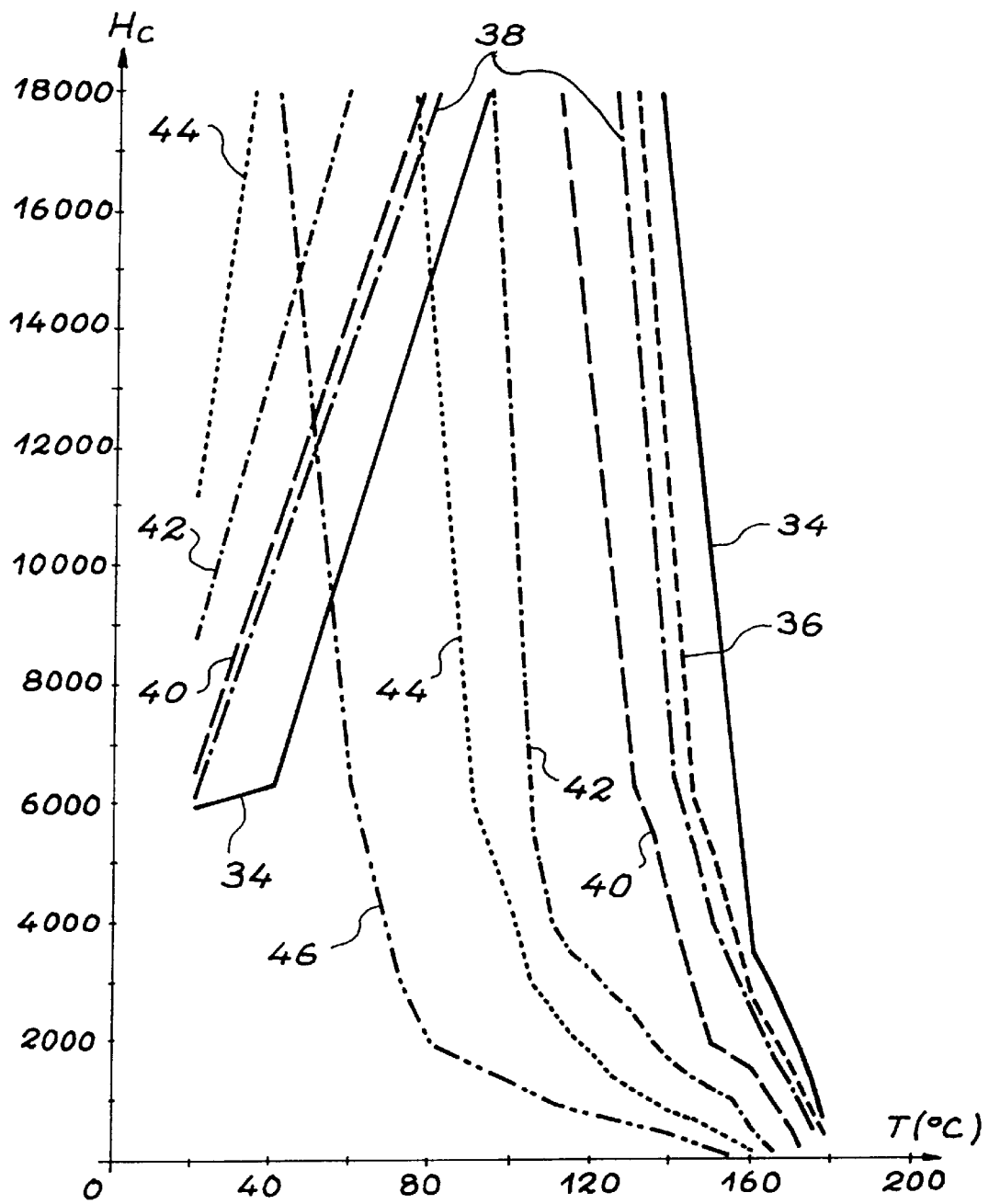
FIG. 8 shows a first case of coercive field Hc variations as a function of the temperature for different $CF_4$ proportions.

FIG. 8 shows the variations of the coercive field Hc as a function of the temperature for different $CF_4$ proportions introduced into the enclosure for the compound $Tb_{24}Fe_{68}Co_8$.

The correspondence between the curves and $CF_4$ percentages is as follows:

curve 34: 0%
curve 36: 0.025%
curve 38: 0.05%
curve 40: 0.125%
curve 42: 0.25%
curve 44: 0.375%
curve 46: 0.5%

Figure 9:
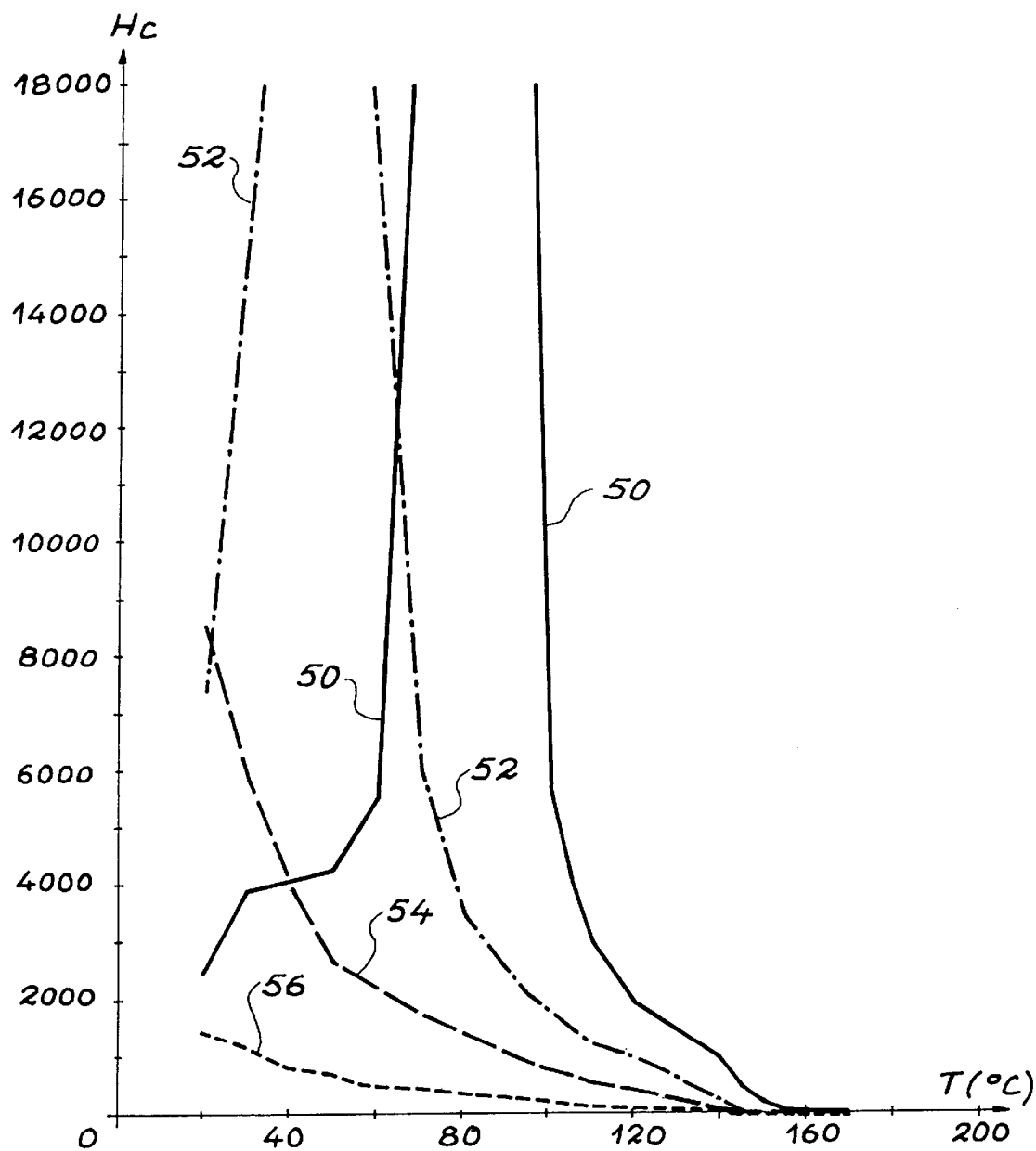
FIG. 9 shows a second case of coercive field Hc variations as a function of the temperature for different $CF_4$ proportions.

FIG. 9 shows the coercive field Hc variations as a function of the temperature for different $CF_4$ proportions introduced into the enclosure for the compound $Dy_{22.5}Fe_{50.5}Co_{22}$, curve 50: 0%
curve 52: 0.125%
curve 54: 0.25%
curve 56: 0.5%

Figure 10A:
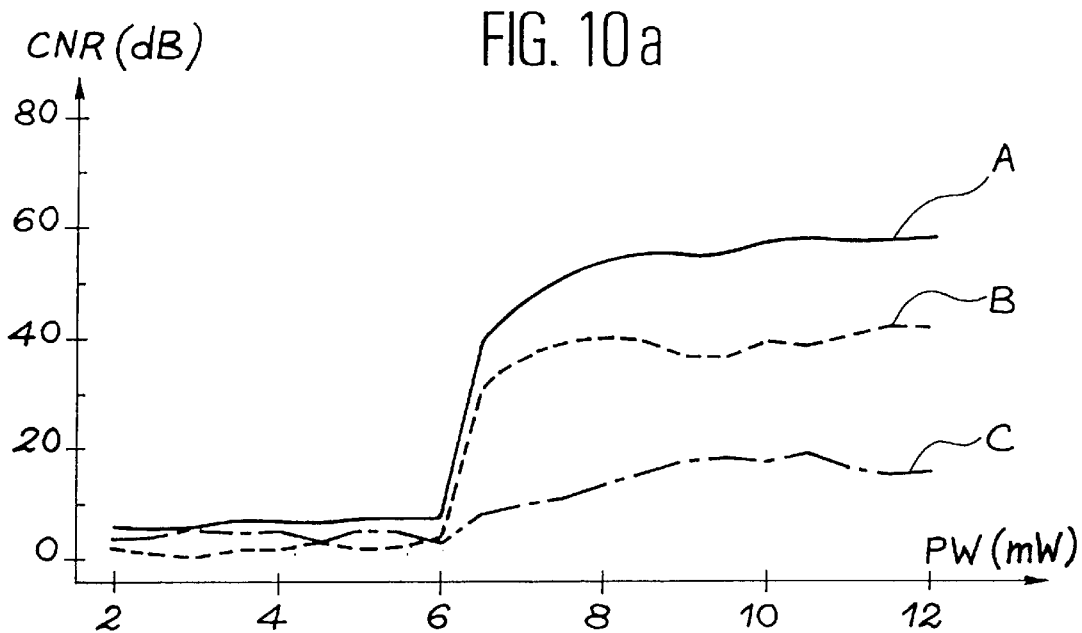
FIGS. 10a, 10b, 10c show the curves of the carrier to noise ratio for three $CF_4$ percentages.
Figure 10B:
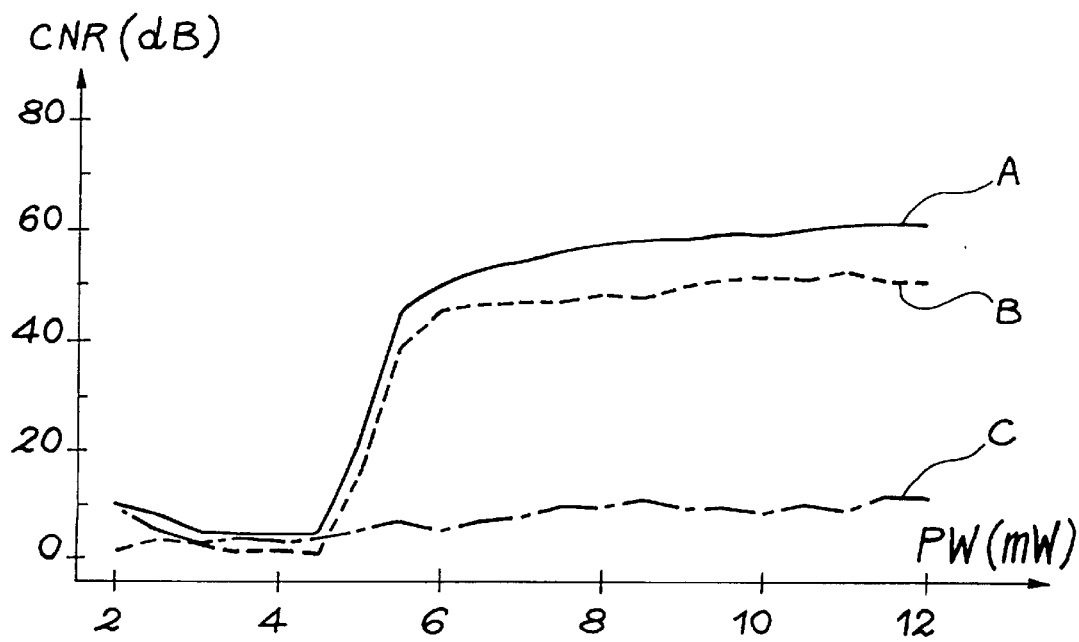
Figure 10C:
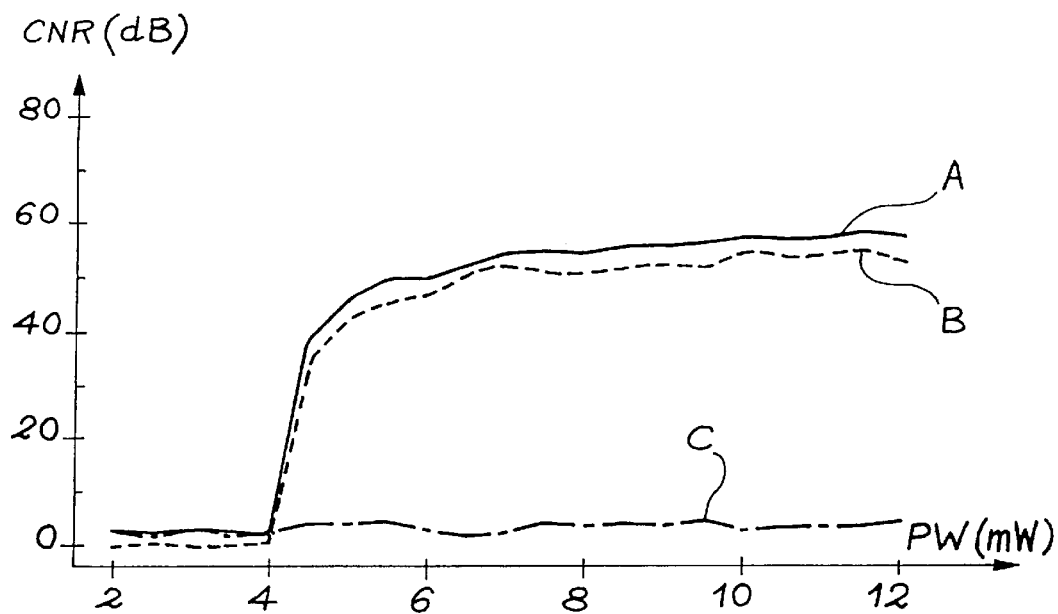

FIGS. 10a, 10b and 10c show the variations of the carrier to noise ratio CNR in dB, as a function of the writing power PW in mW, for three $CF_4$ gas concentrations introduced into argon. These three concentrations are respectively 0 (i.e. there was no detectable trace of fluorine, which corresponds to the prior art), 0.25 and 0.5%.

In the graphs, curves A represent the signal, curves B the carrier to noise ratio and curves C the noise after writing.

These curves clearly show the increase in the carrier to noise ratio resulting from the introduction of $CF_4$, the increase in sensitivity and the reduction of the signal appearance threshold. The carrier to noise ratio increase is largely due to the reduction of the noise level. The gradient, expressing the sensitivity, is double passing from 20 to 40 dB/mWS.

These measurements were carried out under the following conditions:

stack: $Si_3N_4$/TR-MT/$Si_3N_4$/AlTi
thicknesses: 105/30/20/800 nm
TR-MT composition: $Tb_{24}Fe_{66}Co_{10}$
substrates: Glaverbel glass, diameter 80 mm (3½").

The deposition rates were respectively approximately 0.2 nm/s for Si3N4, 0.1 nm/s for TbFeCo and 0.3 nm/s for AlTi. The sputtering machine used the "face to face target" method for avoiding excessive heating of the etched plastic substrate. Any other low temperature machine can be suitable (e.g. the Balzers-SDS 100 machine). For measurement purposes, the substrates used were of Glaverbel glass and were not etched, so as to avoid problems due to the pressing conditions. The sputtering of the TR-MT deposit took place under an argon atmosphere, to which was accurately added a certain $CF_4$ gas quantity. For this purpose, use was made of two gas lines upstream of the enclosure, namely a pure argon line and a line for a mixture of argon and 1% $CF_4$, each controlled by means of a flowmeter. The respective setting of the two flowmeters made it possible to continuously vary the mixture entering the sputtering enclosure.

Figure 11:
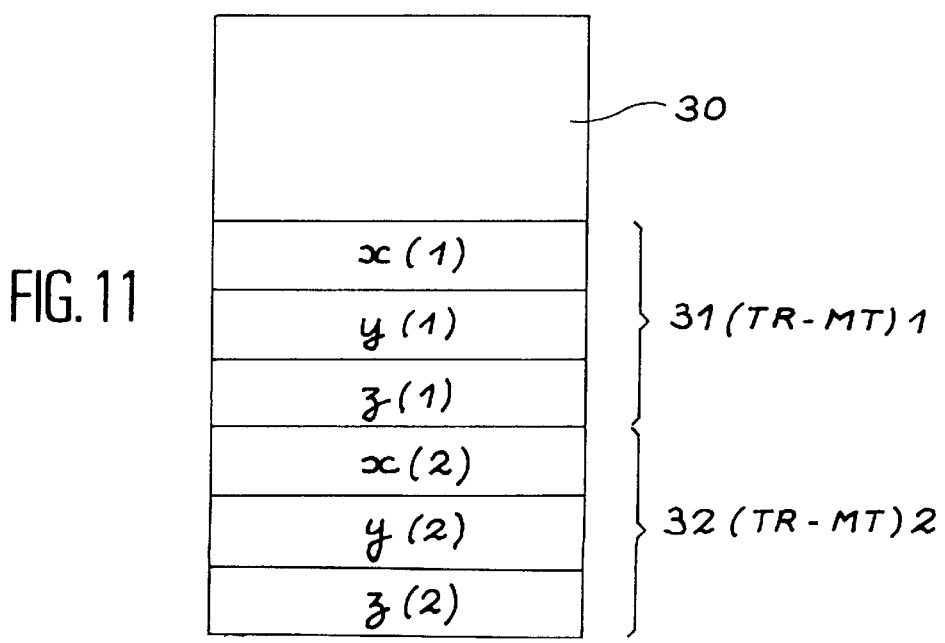
FIG. 11 diagrammatically shows a stack having two different basic compounds.

FIG. 11 shows a six layer stack. A first category of three layers is based on a first (TR-MT)1 compound with variable fluorine proportions x(1), y(1), z(1) and a second category of three other layers based on a second (TR-MT)2 compound, once again with variable fluorine proportions x(2), y(2) and z(2). For example, the first compound can be TbFeCo and the second GdFeCo.

The media or supports described hereinbefore are naturally suitable for all known reading and writing procedures with other support or medium types, e.g. the magnetic super resolution (MSR) procedure.

We claim:

1. A magneto-optical recording medium comprising:
    a stack of at least four magnetic layers comprising successively a reading layer, a writing layer, a switching layer and an initialization layer;
    wherein each magnetic layer includes a compound of at least one rare earth and at least one transition metal, and
    at least one of the magnetic layers comprises a fluorine atomic concentration greater than 0% and less than 1%.

2. A magneto-optical recording medium according to claim 1, wherein the fluorine concentration is approximately 0.5%.

3. A magneto-optical recording medium according to claim 1, wherein the fluorine concentration is approximately 0.25%.

4. A magneto-optical recording medium comprising:
    a stack of magnetic layers comprising a same compound of at least one rare earth and at least one transition metal,
    wherein the magnetic layers have compositions differing only by a fluorine atomic concentration greater than 0% and less than 1%.

5. A magneto-optical recording medium comprising:
    a first stack of magnetic layers of a first compound of at least one rare earth and at least one transition metal, wherein at least one of the layers of said first stack comprises a fluorine atomic concentration greater than 0% and less than 1%; and
    a second stack of magnetic layers of a second compound of at least one rare earth and at least one transition metal, wherein at least one of the layers of said second stack comprises a fluorine atomic concentration greater than 0% and less than 1%.

6. A magneto-optical recording medium according to claim 1, wherein
    the at least four layers comprise a same compound of rare earth and transition metal,
    the initialisation layer has a fluorine atomic concentration lower than that of the reading layer, and
    the reading layer has a fluorine atomic concentration lower than that of the switching layer.

7. A magneto-optical recording medium according to claim 6, wherein the fluorine atomic concentration of the initialisation layer is 0%.

8. A magneto-optical recording medium according to claim 1, wherein the rare earth is a member of the group consisting of Tb, Gd, Dy, Nd and Pr.

9. A magneto-optical recording medium according to claim 1, wherein the transition metal is a member of the group consisting of Fe and Co.

10. A magneto-optical recording medium according to claim 1, wherein the compound of at least one rare earth and at least one transition metal further comprises a metal from the group consisting of Cr, Ti and Mo.

11. A process for producing a magneto-optical recording medium, comprising the steps of:
    placing in a sputtering chamber at least one target comprising a compound of at least one rare earth and at least one transition metal;
    carrying out a cathodic sputtering of said target in the presence of an inert gas;
    depositing on a substrate a stack of magnetic layers by said cathodic sputtering;
    adding a fluorine compound to the sputtering chamber;
    controlling an amount of said fluorine compound during the depositing step so as to obtain at least one magnetic layer with a fluorine atomic concentration greater than 0% and less than 1%.

12. A process according to claim 11, wherein the controlling step is performed so as to obtain a fluorine atomic concentration approximately equal to 0.5%.

13. A process according to claim 11, wherein the controlling step is performed so as to obtain a fluorine atomic concentration approximately equal to 0.25%.

14. A process according to claim 11, wherein only one target is placed in the sputtering chamber.

15. A process according to claim 11, wherein the adding step comprises adding $CF_4$.

16. A process according to claim 11, wherein the adding step comprises adding $SF_6$.

17. A process according to claim 11, wherein two targets of two different compounds are placed in the sputtering chamber.

18. A process for producing in a sputtering chamber a magneto-optical recording medium including a plurality of magnetic layers, comprising the steps of:
    introducing a fluorine compound into the sputtering chamber; and
    controlling Curie temperatures of said magnetic layers by controlling a fluorine atomic concentration of the magnetic layers.

19. A process according to claim 18, wherein the controlling of the Curie temperatures comprises:
    setting a Curie temperature of an initialization layer below that of a reading layer by controlling a fluorine atomic concentration in the initialization layer to be less than a fluorine atomic concentration in the reading layer; and
    setting a Curie temperature of the reading layer below that of a switching layer by controlling a fluorine atomic concentration in the reading layer to be less than a fluorine atomic concentration in the switching layer.

20. A process according to claim 18, wherein the introducing step comprises introducing $CF_4$.

21. A process according to claim 18, wherein the introducing step comprises introducing $SF_6$.

* * * * *